United States Patent [19]

Houck

[11] Patent Number: 5,154,557
[45] Date of Patent: Oct. 13, 1992

[54] TORQUE LIMIT BOLT WHICH IS REUSABLE AND HAS NO BREAKAWAY PARTS

[75] Inventor: Jon D. Houck, Rockford, Ill.

[73] Assignee: The United States of America as represented by the Secretary of the Air Force, Washington, D.C.

[21] Appl. No.: 849,614

[22] Filed: Feb. 27, 1992

[51] Int. Cl.$^5$ .............. F16B 31/00; F16B 33/04
[52] U.S. Cl. ............................. 411/7; 411/6
[58] Field of Search ....................... 411/1–7, 411/14, 916, 917

[56] References Cited

U.S. PATENT DOCUMENTS

| | | | |
|---|---|---|---|
| 2,373,812 | 4/1945 | Coop | 411/6 |
| 2,685,812 | 8/1954 | Dmitroff | 411/7 |
| 3,425,314 | 2/1969 | Ohlson | 411/7 |
| 3,498,174 | 3/1970 | Schuster et al. | |
| 3,504,591 | 4/1970 | Christophersen | 411/6 |
| 3,812,757 | 5/1974 | Reiland | |
| 4,176,582 | 12/1979 | Witte | 411/7 |

FOREIGN PATENT DOCUMENTS 562678 6/1977 U.S.S.R. ................... 411/7

Primary Examiner—Neill R. Wilson
Attorney, Agent, or Firm—Robert L. Nathans; Donald J. Singer

[57] ABSTRACT

A reusable torque limiting bolt having no breakaway parts is provided which has a collar rigidly coupled to an upper bolt portion via four cylindrical pins which are seated in four detents internally formed on the collar and four detents externally formed on the bolt surface. At low torque the collar drives the bolt since the pins remained seated in the pairs of facing detents. When a predetermined substantial torque is reached, the pins roll out of the detents to decouple the bolt from the collar, thus limiting the applied torque.

20 Claims, 1 Drawing Sheet

TORQUE LIMIT BOLT WHICH IS REUSABLE AND HAS NO BREAKAWAY PARTS

BACKGROUND OF THE INVENTION

The present invention relates to the field of torque limiting bolts.

Aircraft engines have control and accessory hardware bolted to their casings; these bolted attachments are candidates for a torque limiting bolt. The bolting of hardware to engine casings requires specific levels of bolt stress which are commonly achieved by correlating bolt stress to a specific bolt torque and measuring it by a torque wrench, or correlating bolt stress by to a specific rotation of the bolt that produces stress in the bolt and measuring the rotation in degrees, or correlating bolt stress to change in bolt length and measuring bolt length before and after tightening. The problem with these methods and some others used more rarely, is the need to take measurements during the bolting process which is time consuming, subject to operator error, and requires some kind of measuring tool.

BRIEF SUMMARY OF THE INVENTION

The present invention eliminates the need for the aforesaid measurements and in addition, enables immediate reuse of the bolt without modifying it, for the lifetime of the bolt threads. Furthermore, installation time is reduced and common bolt head sizes are possible for different size bolts, without conflicting torque to bolt head requirements. Also, the parts are simple to manufacture, although not without precision, and no breakaway parts are produced to clutter up the environment.

These goals are met by providing an outer collar with internal detents, which collar surrounds the upper body of the bolt. A cylindrical pin is seated within each pair of facing detents formed on the inner surface of the collar and the external surface of the cylindrical bolt body. At low torque, the pins remain seated within the pairs of facing detents and rotation of the collar produces rotation of the bolt. When a predetermined substantial torque is reached, the pins roll out of the detents to prevent further rotation of the bolt by further rotation of the collar, thus limiting the applied torque.

Other objects, features and advantages of the invention will become apparent upon study of the following description taken in conjunction with the drawings in which.

DETAILED DESCRIPTION

Figure 1:
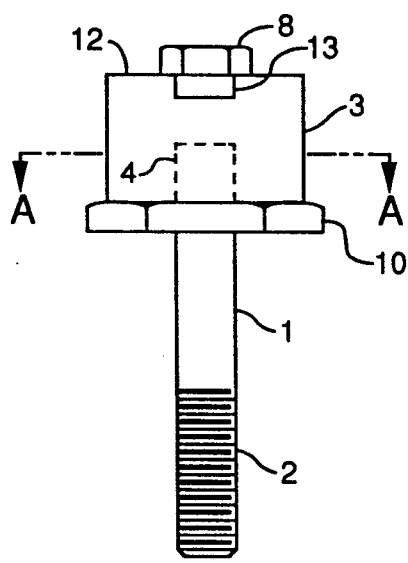
FIG. 1 illustrates a side view of the bolt of the invention.
Figure 3:
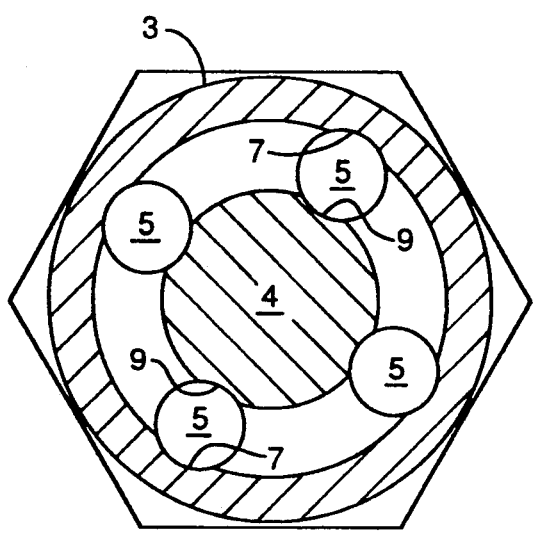
FIG. 3 illustrates a sectional view taken through A—A of FIG. 1.

As shown in FIG. 1, a cylindrical bolt body 1 has a threaded portion 2 and a cylindrical collar 3 coupled to the upper bolt body by four cylindrical pins 5 seated within four pairs of facing detents in the form of shallow troughs 7 and 9 formed respectively in the internal surface of the collar 3 and the external surface of the upper portion of the cylindrical bolt 4 as shown in FIG. 3.

Figure 2:
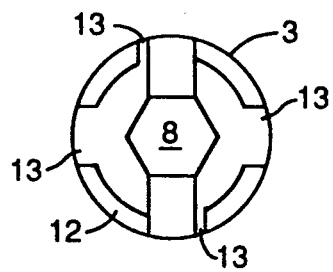
FIG. 2 illustrates a top view of the bolt.

The upper portion of the cylindrical collar 3 surrounding the upper bolt body has a crossbar hexagonal head 8 seated within the upper castled portions 12 of the collar, which castled portions are defined by four slots 13 formed at right angles with each other within the top cylindrical shell portion of the collar 3 as shown in FIG. 2. A wrench is applied to the hex nut 8 which rotates the collar 3 and the upper bolt head portion 4 via the seated pins 5. When the applied torque reaches a predetermined amount, the rolling pins are able to climb out of the detents during turning of the outer collar at which time they roll freely to the starting point of a new pair of detents where they fall into place to repeat the sequence. Thus by this climb and fall action of the rollers, a torque limit can be achieved. Before the pins roll out of the detents, resistance to turning is produced by expansion and flexing of the outer collar. Subsequent removal of the bolt is enabled by removal hex member 10 which is a part of the bolt body.

Figure 4:
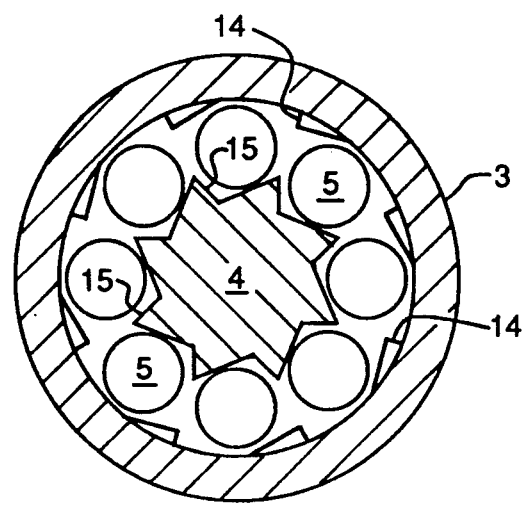
FIG. 4 shows an alternative embodiment of FIG. 3.

As the worker in the art will appreciate, the number of rolling pins and detents are a design variable determined by the size of the bolt and the amount of torque being limited. The ratio of rolling pin diameter, outer collar inside diameter and bolt body outside diameter are critical to the proper rolling pin travel distance between detents. Also, it is possible to have different torques in opposite directions of rotations by changing the detent configurations. For example, a gradual ramp between detents in one direction of rolling pin motion as opposed to a steep ramp in the opposite direction of motion would make torque limit values directionally sensitive. An example is shown in FIG. 4 wherein the gradual/steep configuration is produced by the asymmetrical sawtoothed elements 14 and 15 which define the detents. Balls could replace the rolling pins depending upon allowable contact stresses for a desired torque limit.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A torque limiting bolt comprising:
   (a) a bolt body having an upper portion and a lower threaded portion;
   (b) an outer collar surrounding the upper portion of said bolt body;
   (c) a plurality of pairs of facing detents formed in the internal surface of said outer collar and the external surface of said bolt body; and
   (d) a roller member positioned within each pair of facing detents, each roller member being configured to climb out of its associated pair of detents upon the application of a substantial predetermined torque to said outer collar to limit the torque applied to the bolt body.

2. The torque limit bolt of claim 1 wherein said roller members are cylindrical pins.

3. The torque limit bolt of claim 1 wherein said bolt has at least four roller members positioned within four pairs of widely separated detents.

4. The torque limit bolt of claim 2 wherein said bolt has at least four roller members positioned within four pairs of widely separated detents.

5. The torque limit bolt of claim 2 wherein said detents consist of shallow curved troughs.

6. The torque limit bolt of claim 3 wherein said detents consist of shallow curved troughs.

7. The torque limit bolt of claim 1 wherein said detents are formed between sawtoothed elements.

8. The torque limit bolt of claim 2 wherein said detents are formed between sawtoothed elements.

9. The torque limit bolt of claim 1 including a second bolt head coupled to said collar for rotating said collar.

10. The torque limit bolt of claim 6 including a second bolt head coupled to said cylindrical collar for rotating said collar.

11. A torque limiting bolt comprising:
    (a) a cylindrical bolt body having an upper portion and a lower threaded portion;
    (b) an outer cylindrical collar surrounding the upper portion of said cylindrical bolt body;
    (c) a removal bolt head affixed to said cylindrical bolt body between said upper bolt portion and said lower bolt portion;
    (d) pairs of facing detents formed in the internal surface of said outer collar and the external surface of said cylindrical bolt body;
    (e) a roller member positioned within each pair of facing detents, each roller member being configured to climb out of its associated pair of detents upon the application of a substantial predetermined torque to said outer cylindrical collar to limit the torque applied to the bolt body.

12. The torque limit bolt of claim 11 wherein said roller members are cylindrical pins.

13. The torque limit bolt of claim 11 wherein said bolt has at least four roller members positioned within four pairs of widely separated detents.

14. The torque limit bolt of claim 12 wherein said bolt has at least four roller members positioned within four pairs of widely separated detents.

15. The torque limit bolt of claim 12 wherein said detents consist of shallow curved troughs.

16. The torque limit bolt of claim 13 wherein said detents consist of shallow curved troughs.

17. The torque limit bolt of claim 11 wherein said detents are formed between asymmetrical sawtoothed elements.

18. The torque limit bolt of claim 12 wherein said detents are formed between sawtoothed elements.

19. The torque limit bolt of claim 11 including a collar driving bolt head coupled to said cylindrical collar for rotating said collar.

20. The torque limit bolt of claim 16 including a collar driving bolt head coupled to said cylindrical collar for rotating said collar.

* * * * *